United States Patent [19]

Sudo

[11] Patent Number: 5,692,192
[45] Date of Patent: Nov. 25, 1997

[54] LOAD DISTRIBUTION METHOD AND SYSTEM FOR DISTRIBUTED THREADED TASK OPERATION IN NETWORK INFORMATION PROCESSING APPARATUSES WITH VIRTUAL SHARED MEMORY

[75] Inventor: Yoshiaki Sudo, Chigasaki, Japan

[73] Assignee: Canon Kabushiki Kaisha, Tokyo, Japan

[21] Appl. No.: 502,702

[22] Filed: Jul. 14, 1995

[30] Foreign Application Priority Data

Jul. 19, 1994 [JP] Japan .................................. 6-166824

[51] Int. Cl.$^6$ ...................................................... G06F 13/00
[52] U.S. Cl. ......................... 395/675; 395/474; 395/475; 395/413
[58] Field of Search ................................ 395/650, 400, 395/200, 425, 675, 474, 475, 413; 364/280.6, 281, 281.8, 281.7, 243.4

[56] References Cited

U.S. PATENT DOCUMENTS

| | | | |
|---|---|---|---|
| 5,031,089 | 7/1991 | Liu et al. .................................. | 364/281 |
| 5,287,508 | 2/1994 | Hejna, Jr. et al. ........................ | 394/650 |
| 5,396,614 | 3/1995 | Khalidi et al. ........................... | 395/425 |
| 5,452,447 | 9/1995 | Nelson et al. ........................... | 395/650 |

OTHER PUBLICATIONS

Malkawi et al, Process Migration nn Virtual Memory Multicomputer Systems, System Sciences, 1993 Annual Intl. Conf., vol. II pp. 90–98.

Alkalaj et al, Performance of Multi-Threaded Execution in a Shared-Memory Multiprocessor, Parallel & Distributed Processing, 1991, pp. 330–333.

Shivaratri et al, Load Distributing For Locally Distributed Systems, Computer Magazine, Dec. 1992, V25, J 12, pp. 33–44.

Anderson et al, The Performance Implications of Thread Management Alternatives For Shared Memory Multiprocessors, IEEE Trans. SN Comp. V 38 No. 12 Dec. 1989 pp. 1631–1644.

"*T: A Multithreaded Massively Parallel Architecture" by R.S. Nikhil et al. 19th Annual Int'. Symposium on Computer Architecture Gold Coast, QLD., May 19–21, 1992, ACM Sigarch Computer Architecture News; vol. 20, No. 2, May 1992, vol. 20. No. 2. pp. 156–167.

"Load Balancing with network partitioning using host groups" by D.J. Evans; Parallel Computing, Mar. 1994, Netherlands, vol. 20, No. 3 ISSN 0167–8191 pp. 325–345.

Primary Examiner—Lucien U. Toplu
Attorney, Agent, or Firm—Fitzpatrick, Cella, Harper & Scinto

[57] ABSTRACT

In a load distribution method, the load in the entire distributed system is uniformly distributed. In a system in which a plurality of information processing apparatuses (nodes) are connected with a network, the degree of distribution of each distributed task is controlled by expanding or compressing the task. Load distribution is performed by expanding a distributed task operating in a heavily loaded node to a lightly loaded node, and compressing the distributed task from the heavily loaded node and transferring threads within the distributed task. Load distribution servers execute the load distribution method.

8 Claims, 9 Drawing Sheets

DISTRIBUTED TASK

NODE A    NODE B

COMPANSION

NODE A    NODE B

FIG.5

NODE A    NODE B

⇩ COMPRESSION

NODE A    NODE B

LOAD DISTRIBUTION METHOD AND SYSTEM FOR DISTRIBUTED THREADED TASK OPERATION IN NETWORK INFORMATION PROCESSING APPARATUSES WITH VIRTUAL SHARED MEMORY

BACKGROUND OF THE INVENTION

1. Field of the Invention

This invention relates to a load distribution method and system for controlling a task operating in a plurality of information processing apparatuses.

2. Description of the Related Art

In multiprocessor-type information processing apparatuses each including a plurality of processors, a program form called a task/thread model capable of effectively utilizing these processors has been proposed. In this model, a program is divided into a plurality of execution modules called threads, and units called tasks to which resources are allocated. The threads are units to which processor resources are allocated. Other resources, such as a storage space resource and the like, are allocated to tasks, and are released for all threads within each task. The task/thread model is a model for programs for efficiently using processor resources in a multiprocessor-type information processing apparatus.

User-level threads, for example, capable of switching contexts and generating threads within a user space in an ordinary task/thread-model program have also been proposed. This type of thread has been proposed in order to improve such disadvantages of an ordinary task/thread model as that, for example, generation of threads and switching of contexts require a system call to an operating system (OS) kernel, resulting in a low speed of processing. The user-level thread has such advantages as that a plurality of contexts can be provided, and generation of threads, switching of contexts, and the like can be performed within a user space, permitting a high speed of processing. In contrast to such a user-level thread, a thread controlled by a conventional OS kernel is called a kernel-level thread.

A distributed task/thread model has also been proposed in which, using a distributed virtual shared memory method for realizing virtual shared storage between tasks in a plurality of information processing apparatuses by controlling a conventional memory management unit and a network between the information processing apparatuses without providing a particular apparatus, the entire virtual storage space within each task is shared and a plurality of threads are operated in the shared state. In this model, the entire main storage in respective tasks in a plurality of information processing apparatuses is made distributed virtual shared memory, and those tasks are considered together as one distributed task having at least one thread. In the distributed task/thread model, multiprocessor-type information processing apparatuses in the above-described task/thread model are replaced by connection of a plurality of information processing apparatuses with a network so as to use these distributed resources efficiently. In distributed shared virtual shared memory, a network is mainly used for transfer of page data having a fixed length, so that a high-speed network can be efficiently used.

In a system comprising distributed information processing apparatuses, load is not uniformly distributed among the information processing apparatuses. Hence, various kinds of load distribution methods have been proposed in order to prevent concentration of load. Conventional load distribution methods comprise, for example, a method called task migration, in which a task in operation is transferred from a heavily loaded information processing apparatus to a lightly loaded information processing apparatus, and a method called remote task execution in which a task to be executed in a heavily loaded information processing apparatus is instead executed in a lightly loaded information processing apparatus. In the task migration method in which a task in operation is transferred, the entire task, in its present state of execution, must be transferred to an entirely different information processing apparatus. In the remote task execution method, such transfer is unnecessary, and it is only necessary to transfer a small amount of information, such as the name of the task in execution, environment for execution, arguments and the like. However, since it is impossible to transfer a task which has once been started, the time of execution of load distribution is limited.

In both the above-described task migration method and the remote task execution method, a task is completely transferred to and operates in another information processing apparatus, although the time of transfer differs. This causes no problem when distributed information processing apparatuses have the same processing capability, the load of the overall distributed system is high, and a task in an information processing apparatus whose load is particularly heavy from among the apparatuses can be transferred to a lightly loaded information processing apparatus. Suppose a case in which the load of the entire distribution system is light and the number of operation tasks is less than the number of information processing apparatuses. In such a case, even if there is a task in which a large number of threads are generated, and load is heavy in the information processing apparatus in which the task operates, transfer of the task to a lightly loaded information processing apparatus cannot equalize the load even if the load is transferred; and only the load of the first information processing apparatus is reduced.

That is, when the number of tasks in operation is small, in the above-described load distribution methods in which a task is completely transferred and operates, information processing apparatuses to which no task is allocated are present, thereby wasting the processing capability of these apparatuses.

Consider a case in which respective information processing apparatuses have different processing capabilities (including a case in which the number of processors possessed by each information processing apparatus differs). In such a case, when the load of each information processing apparatus is not equal and therefore it is intended to transfer a task, no problem arises in the transfer of the task from an information processing apparatus having a low processing capability to an information processing apparatus having a high processing capability. However, the transfer of the task from an information processing apparatus having a high processing capability to an information processing apparatus having a low processing capability causes the following problems.

That is, when load is concentrated and several tasks operate in an information processing apparatus A having a high processing capability, and a task in operation has been terminated and no load is present in an information processing apparatus B having a low processing capability, one of the tasks in the apparatus A is transferred to the apparatus B. Thereafter, the apparatus A completes execution of remaining tasks because it has a high processing capability, but the task transferred to the apparatus B continues to operate because the apparatus B has a low processing capability. Accordingly, an inversion phenomenon occurs, i.e., the execution of the task would already have been completed if it had not been transferred to the apparatus B.

In order to prevent such a phenomenon, the task transferred to the apparatus B may be retransferred to the apparatus A. However, in the remote task execution method, a task which has already operated cannot be transferred. Also, in the case of the task migration method, retransfer of a task causes a decrease in processing efficiency. It can be considered to select a light-load task having a short processing time period from among tasks operating in the apparatus A so that it is meaningful to execute the task in the apparatus B. However, it is difficult to select such a task during an operation in a conventional technique. In consideration of the above-described problems, in general, it has not been actively considered to transfer a task to an information processing apparatus having a low processing capability.

SUMMARY OF THE INVENTION

According to the present invention, in a system having a mechanism of connecting a plurality of distributed information processing apparatuses with a network, and executing tasks by distributing threads within a distributed task sharing virtual storage space, when it is determined that load is not equal as a result of collection of load information from (or at least relating to) each of the information processing apparatuses, by controlling the degree of distribution of a distributed task in operation and transferring threads operating within the distributed task, the load in the information processing apparatuses is distributed, and the processing capabilities of the information processing apparatuses of the entire system can be sufficiently utilized.

By providing a user-level thread control mechanism in a distributed task and using context switching in a user distributed virtual shared memory space, the load in the information processing apparatuses can be distributed without actually transferring threads within the distributed task.

By periodically circulating load information of a concerned apparatus as a message, efficient load information can be collected.

By collecting load information from (or relating to) other information processing apparatuses only when the state of the load of a concerned apparatus increases or decreases, and expansion of a distributed task and transfer of threads must be performed, load information can be collected efficiently.

According to one aspect, the present invention relates to a load distribution method having a mechanism of connecting a plurality of information processing apparatuses with a network, and executing a distributed task whose main storage is shared by a distributed virtual shared memory method, present in the plurality of information processing apparatuses by distributing threads in the respective information processing apparatuses, comprising the steps of collecting load information about the plurality of information processing apparatuses, controlling the degree of distribution of a distributed task in operation in accordance with the collected load information, and transferring threads operating in a heavily loaded information processing apparatus within the distributed task to a lightly loaded information processing apparatus.

According to another aspect, the present invention relates to a load distribution system having a mechanism of connecting a plurality of information processing apparatuses with a network, and executing a distributed task, whose main storage is shared by a distributed virtual shared memory method, present in the plurality of information processing apparatuses by distributing threads in the respective information processing apparatuses, comprising collection means for collecting load information of the plurality of information processing apparatuses, control means for controlling the degree of distribution of a distributed task in operation in accordance with the collected load information, and transfer means for transferring threads operating in a high-load information processing apparatus within the distributed task to a low-load information processing apparatus.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

A first embodiment of the present invention will now be described in detail with reference to the drawings.

Figure 1:
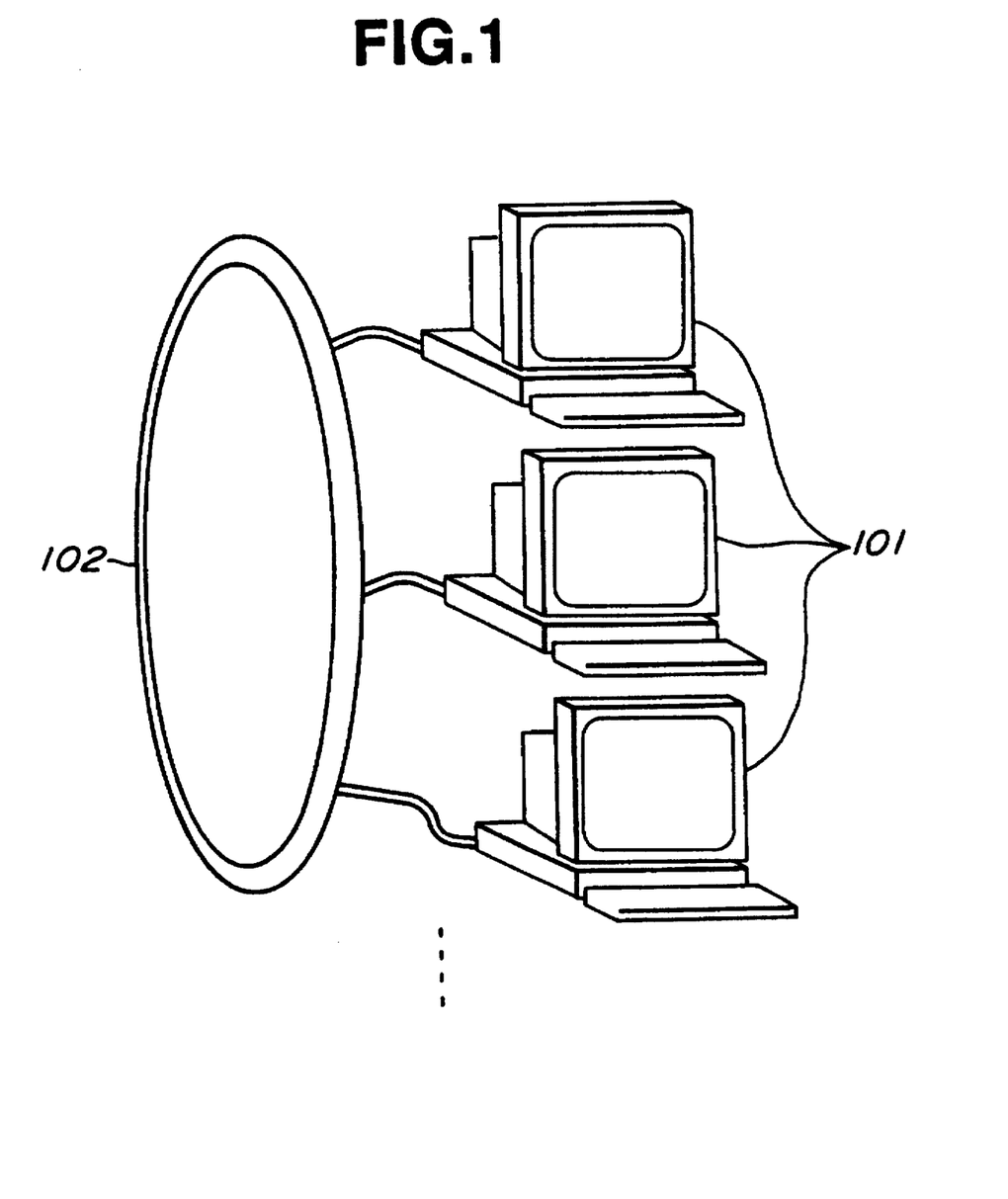
FIG. 1 is a diagram illustrating the configuration of distributed information processing apparatuses using a load distribution method according to a first embodiment of the present invention.

FIG. 1 is a diagram illustrating distributed information processing apparatuses in the first embodiment. Each of the information processing apparatuses can operate as an ordinary information processing apparatus by itself. These information processing apparatuses are connected to one another with a network and can communicate with one another. Each of the information processing apparatuses does not always include a complete set of input and output devices, and does not always have the same processing capability. For example, the number of processors possessed by each of the information processing apparatuses may differ, or the calculation capability of each processor may differ.

Figure 2:
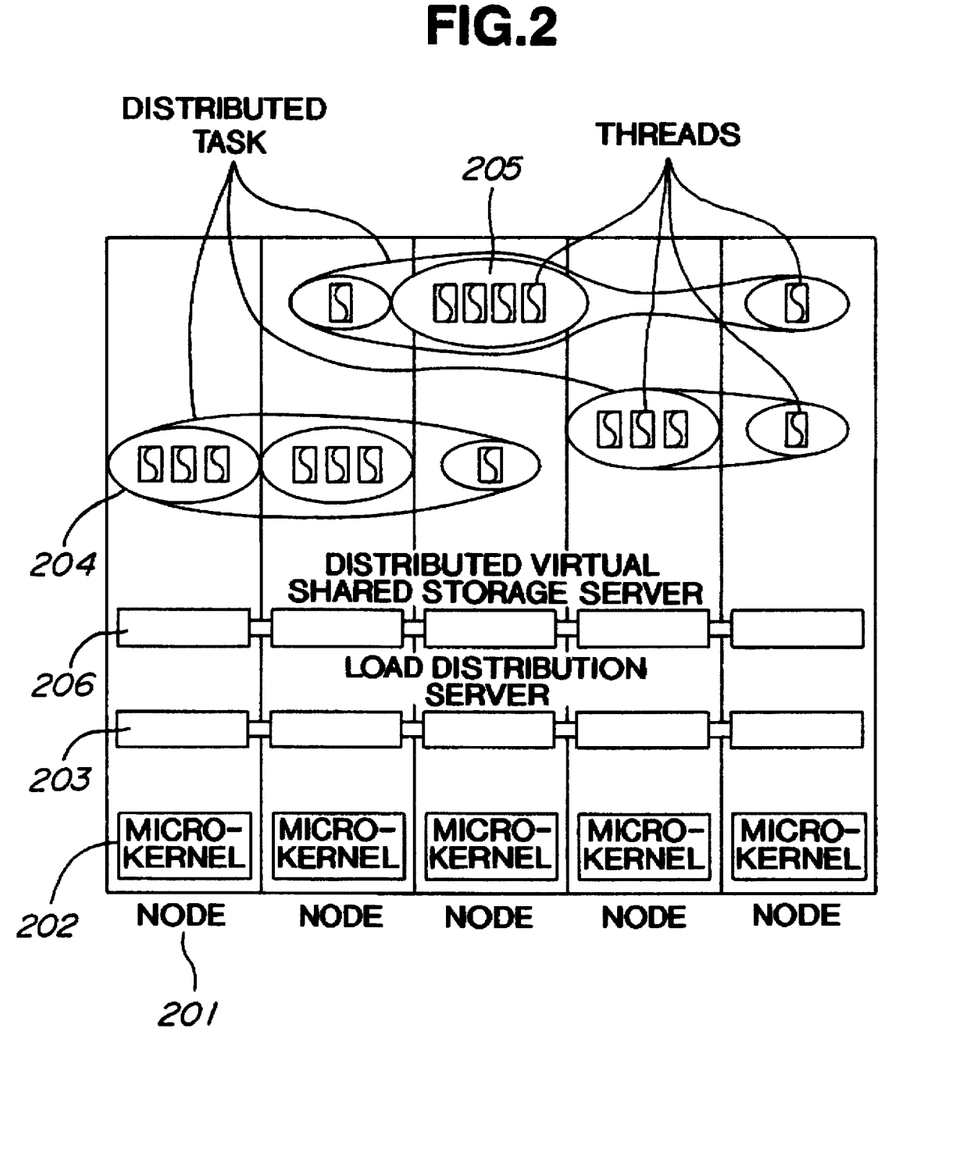
FIG. 2 is a schematic diagram illustrating the load distribution method according to the first embodiment.

FIG. 2 is a schematic diagram illustrating a load distribution method according to the present embodiment. Respective information processing apparatuses (hereinafter termed "nodes") 201 are connected to one another with a network. A microkernel 202 of an operating system controls tasks, main storage within the corresponding node, kernel-level threads and the like. A load distribution server 203 executes the load distribution method of the present embodiment. The servers 203 in the respective nodes 201 perform load distribution by communicating and cooperating with one another. Reference numeral 204 represents a distributed task distributed in a plurality of nodes. Threads 205 operate in each distributed task 204. Distributed virtual shared memory servers 206 realize distributed virtual shared memory of a distributed task.

Figure 3:
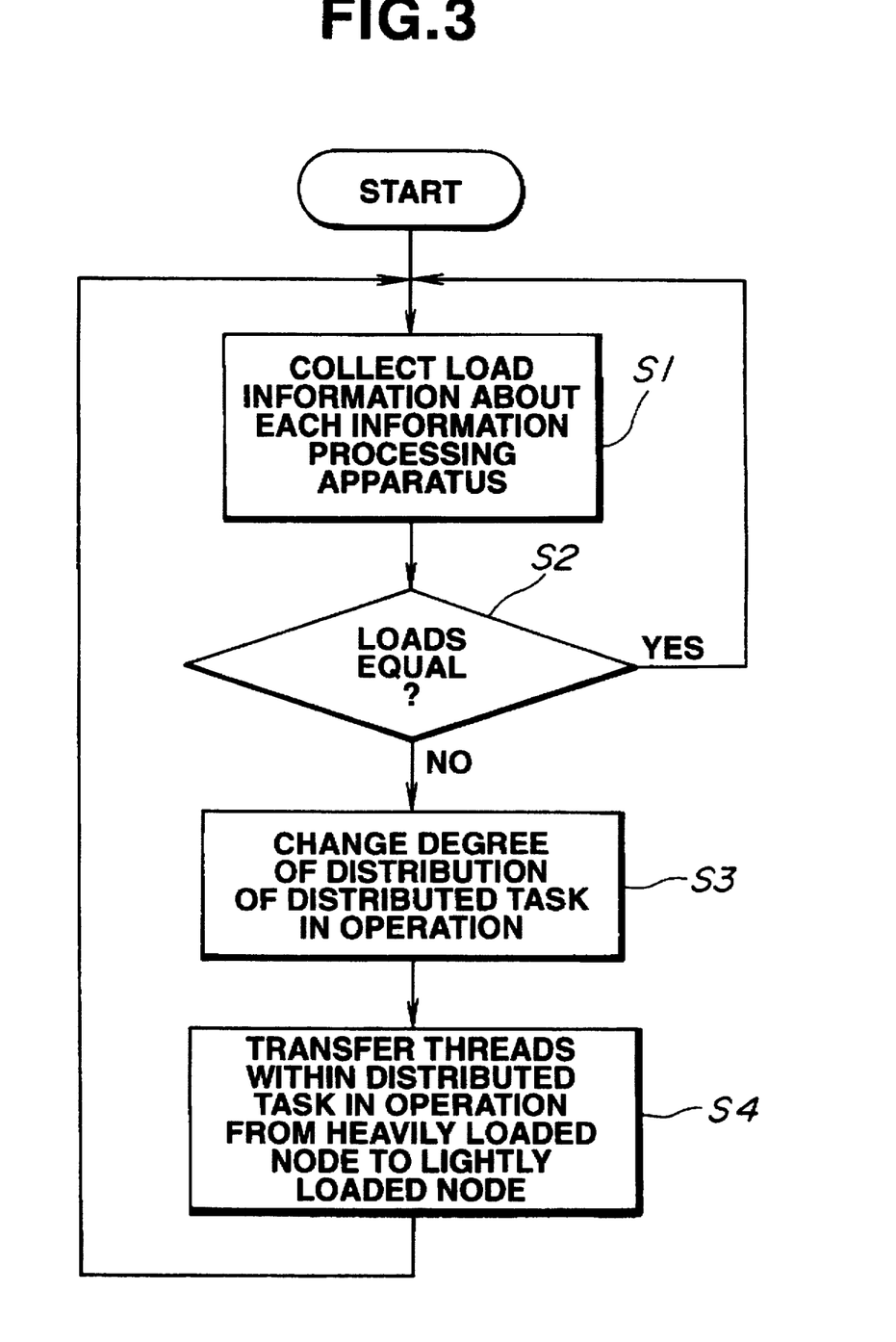
FIG. 3 is a flowchart illustrating processing procedures in the load distribution method of the first embodiment.

FIG. 3 is a flowchart illustrating the load distribution method of the present embodiment.

In step S1, load information of each information processing apparatus is collected as in the conventional load distribution method. In step S2, it is determined if the load information of each information processing apparatus collected in step S1 is equal. If the result of the determination is affirmative, the process returns to step S1. If the result of the determination is negative, i.e., if heavily loaded nodes and lightly loaded nodes are present, the process proceeds to step S3. In step S3, the degree of distribution of a distributed task in operation (the number of nodes where the distributed task operates) is controlled. In step S4, threads within the distributed task in operation are transferred from a heavily loaded node to a lightly loaded node.

Figure 4:
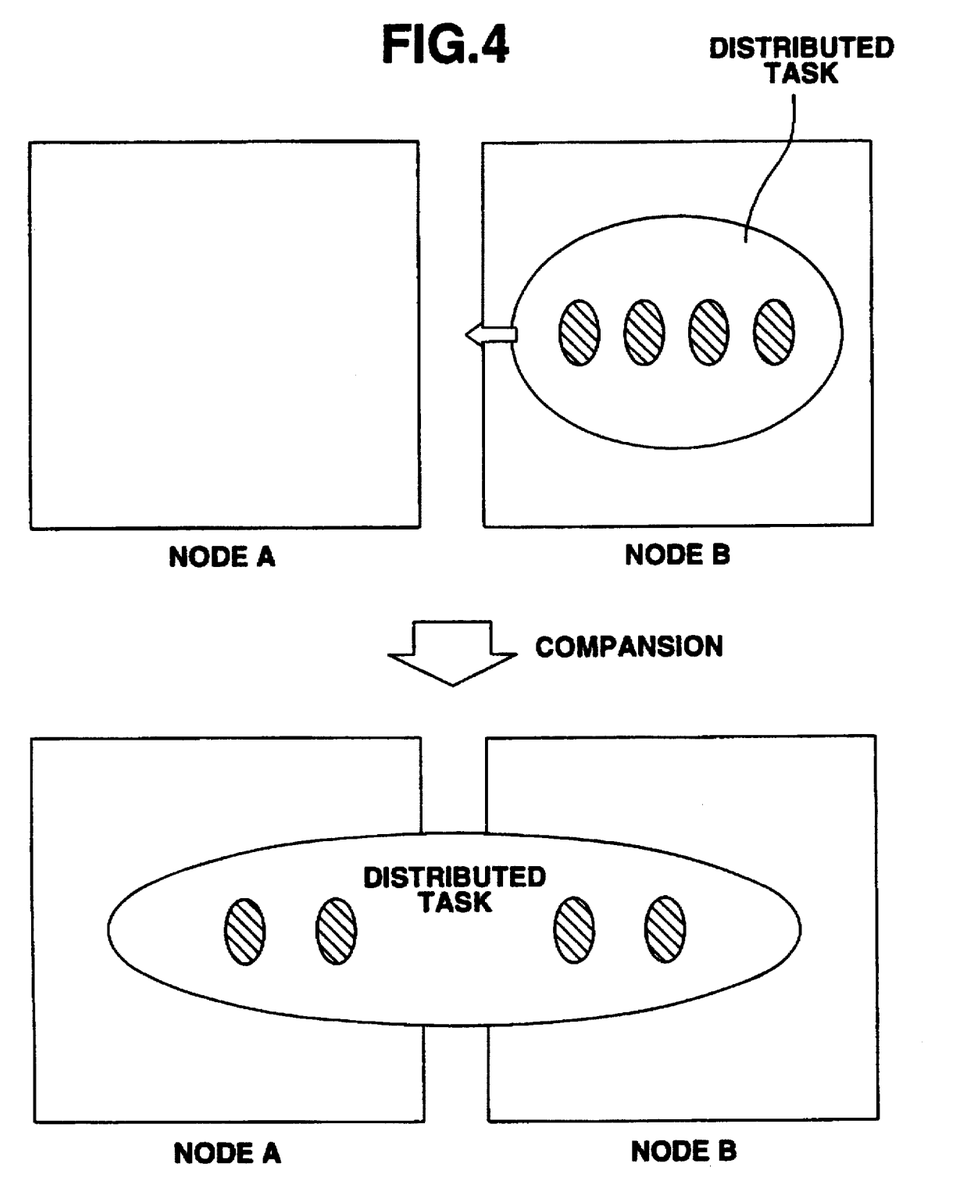
FIG. 4 is a diagram illustrating expansion of a distributed task.

The degree of distribution of a distributed task is controlled according to two methods, i.e., a method of increasing the degree of distribution, and a method of decreasing the degree of distribution. In order to increase the degree of distribution, the distributed virtual shared memory space within the distributed task is expanded to another node, so that threads within the distributed task can operate therein. FIG. 4 is a diagram illustrating the concept of expansion of a distributed task.

Figure 5:
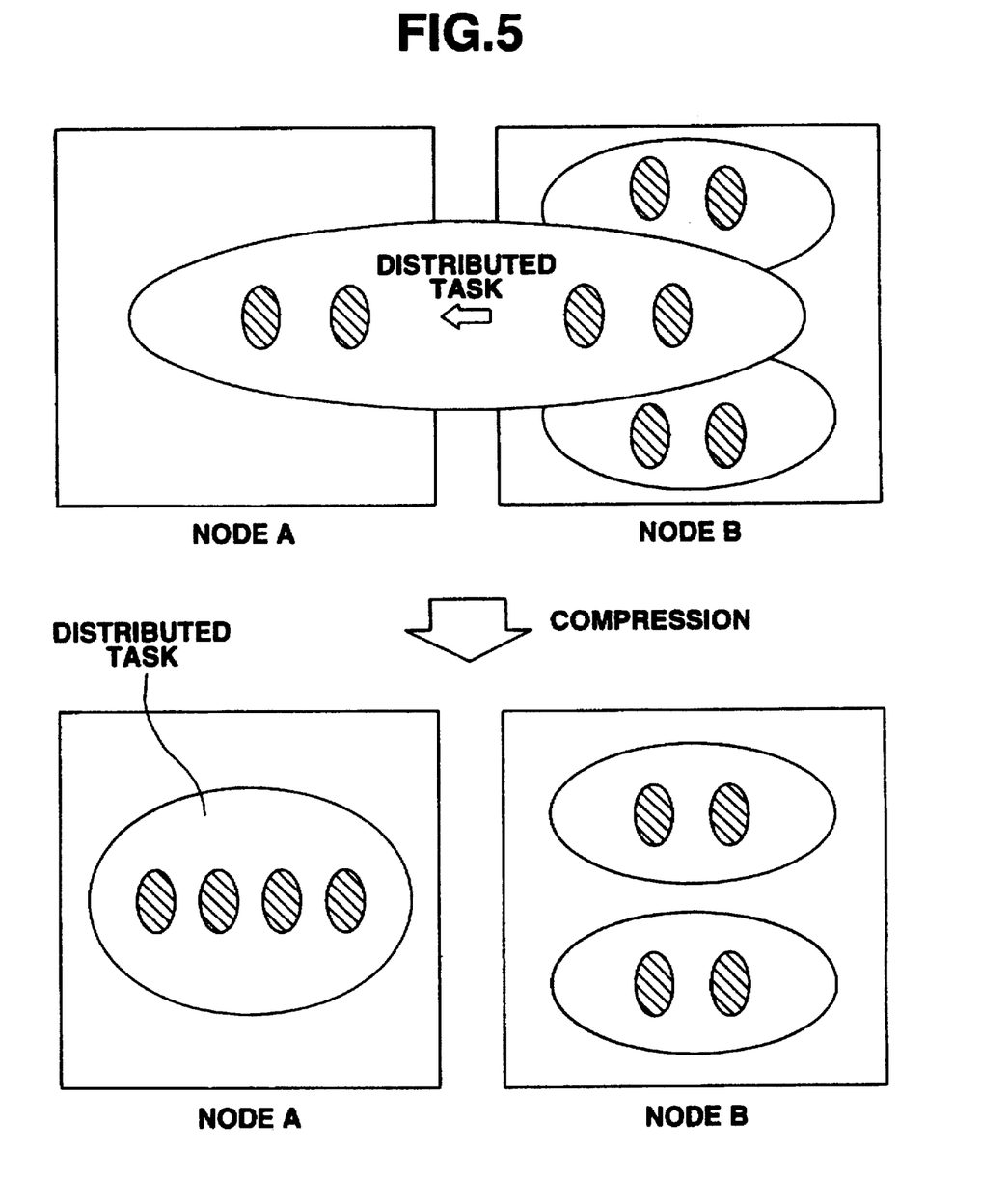
FIG. 5 is a diagram illustrating compression of a distributed task.

In order to decrease the degree of distribution, all threads are transferred from a node where the distributed task operates as a result of expansion to another node where the distributed task is present, and sharing in the distributed virtual shared memory is cancelled for the node from where all the threads have been transferred. FIG. 5 is a diagram illustrating the concept of compression of a distributed task.

In the upper portion of FIG. 5, four threads are present in node B in addition to two threads shared by the distributed virtual shared memory, i.e., six threads are present in total in node B. On the other hand, two threads are present in node A. In order to distribute the load of the heavily loaded node B, sharing of threads in the distributed virtual shared memory is cancelled to decrease the degree of distribution and to compress the distributed task. As a result, as shown in the lower portion of FIG. 5, four threads are present in each of nodes A and B, so that load distribution is realized.

In the load distribution method of the present embodiment, by performing expansion and compression of a distributed task in the above-described manner, the degree of distribution of the distributed task is controlled, and load distribution is performed by expanding a distributed task operating in a heavily loaded node to a lightly loaded node, or compressing the distributed task into the lightly loaded node (from a heavily loaded node), and transferring threads within the distributed task.

Only one or the other of expansion and compression of a distributed task may be performed, or both expansion and compression of a distributed task may be performed, depending on the distribution system. For example, in a system of generating a distributed task while expanding it to nodes whose number equals the degree of parallel operations required for the task, or in a system of expanding a distributed task to another node immediately when the degree of parallel operations required for the task has increased while the distributed task operates, the corresponding load distribution server must compress the distributed task in order to equalize the load of each node.

On the other hand, in a system in which a task does not automatically become a distributed task and is not distributed to another node, and a distributed task is not expanded to another node even if the degree of parallel operations increases, a load distribution server performs expansion of a distributed task in order to distribute the load of each node. In such a case, when a distributed task is not compressed and the load of each node uniformly increases, the effect of load distribution may be obtained merely by suppressing expansion of the distributed task. However, the effect of load distribution will be improved by also performing compression of the distributed task.

Figure 6:
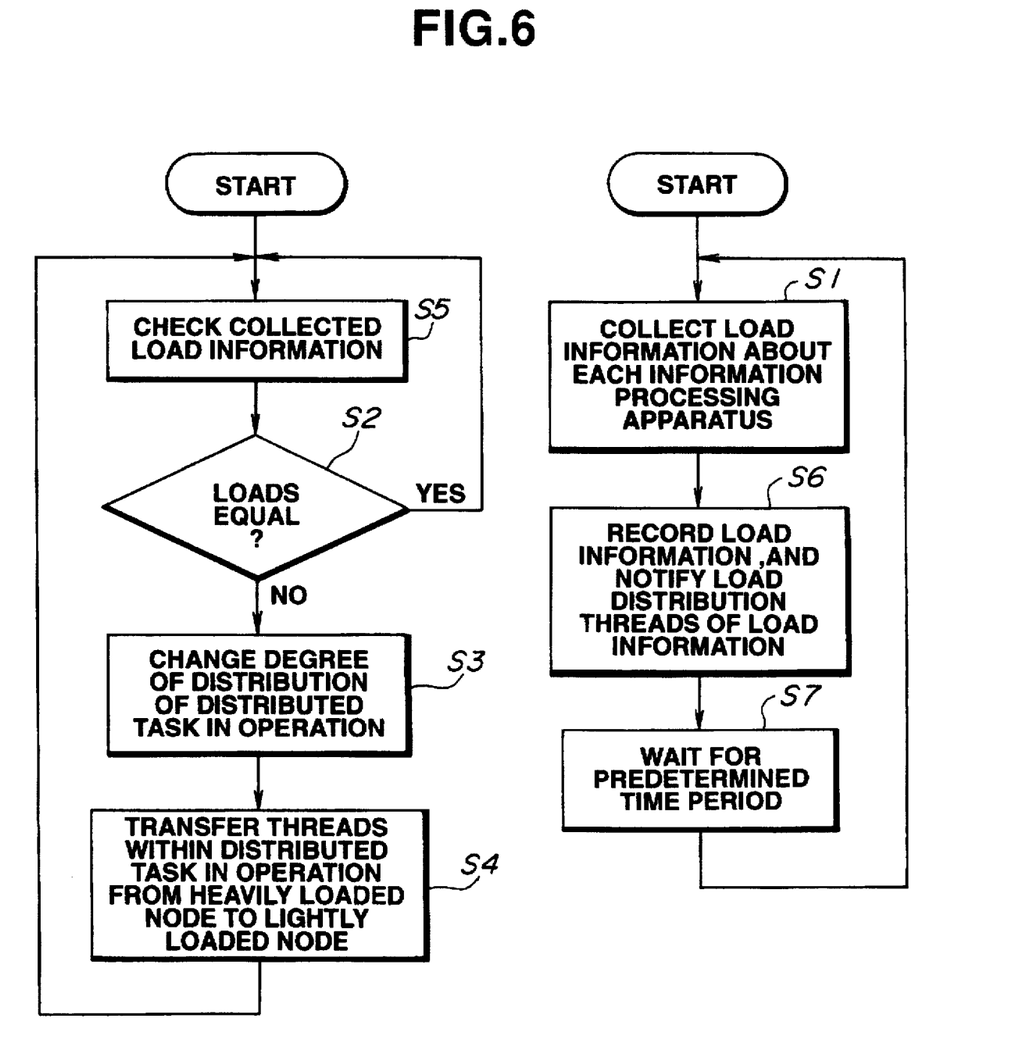
FIG. 6 is a flowchart when collection of load information is performed in another thread.

Although in the flowchart shown in FIG. 3, collection of load information and load distribution are performed within the same flow, these two operations may be performed with different flows, as shown in FIG. 6. Processing from step S1 to step S4 shown in FIG. 6 is the same as the processing from step S1 to step S4 shown in FIG. 3. Hence, description thereof will be omitted. A description will be provided only of processing from step S5 to step S7. In step S6, processing of recording load information of each information processing apparatus collected in step S1, and notifying load distribution threads of the load information. In step S7, it is awaited for a predetermined time period, and then the process returns to the processing of step S1. In step S5, the collected load information is checked. In the following processing from step S2 to step S4, the processing from step S2 to step S4 shown in FIG. 3 is executed. That is, the collected load information is stored in a storage device which can be referred to from both a thread for performing load distribution and a thread for performing collection of load information, and the collected load information is transferred in the form of a message or the like.

Second Embodiment

In the first embodiment, a description has been provided of a case in which a server for performing load distribution can concentratedly perform decision making. In a second embodiment of the present invention, however, a description will be provided of a case in which respective servers autonomously perform load distribution in a distributed state.

Figure 7:
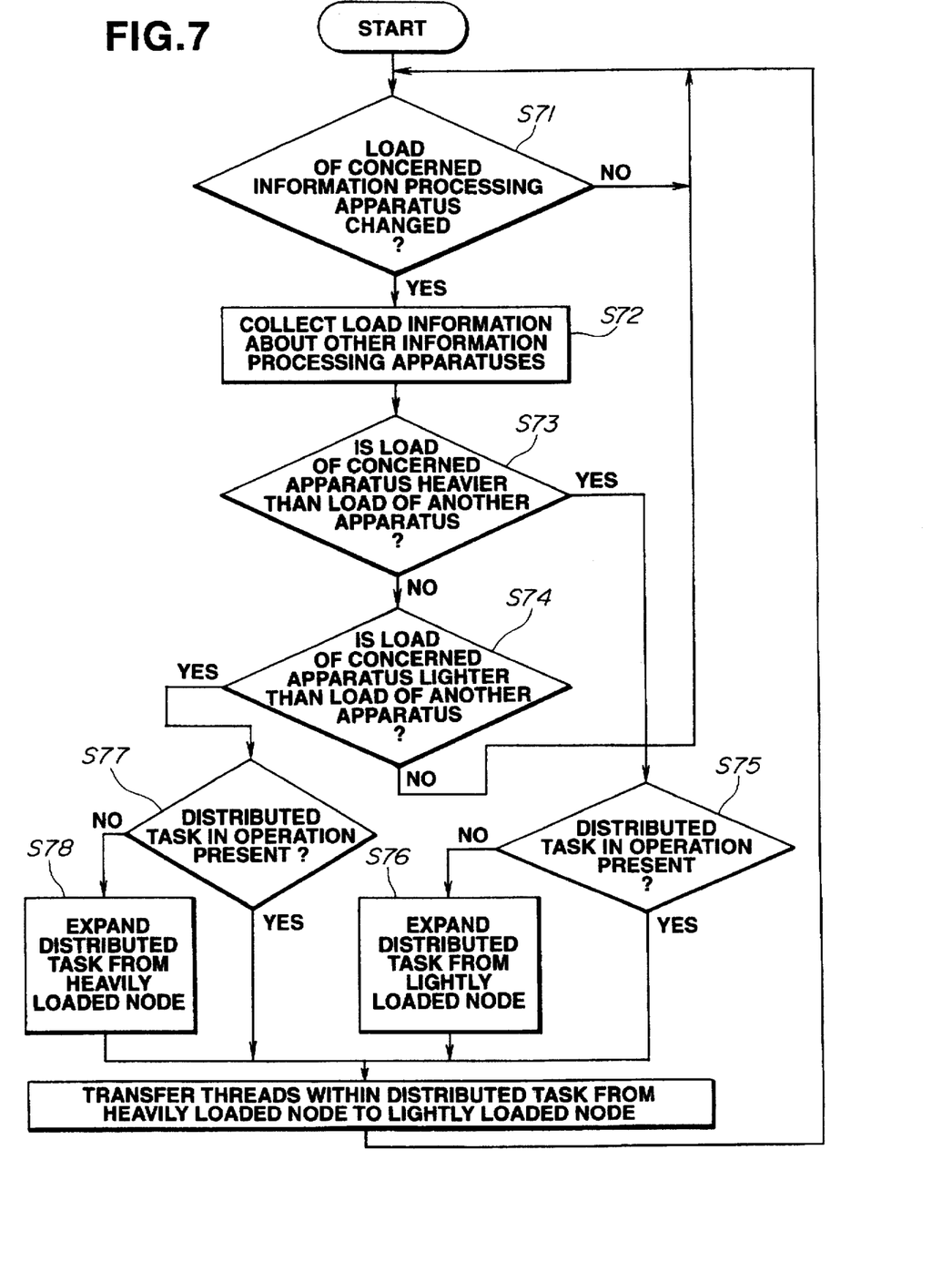
FIG. 7 is a flowchart when load distribution is autonomously performed on distributed nodes according to a second embodiment of the present invention.

FIG. 7 is a flowchart illustrating a load distribution method according to the second embodiment.

In step S71, each load distribution server monitors information relating to the load of the corresponding node. If the load of the corresponding node decreases or increases, the process proceeds to the processing of step S72, where it is intended to perform load distribution. If it is determined in step S71 that the load does not change, the process returns to the processing of step S71. In step S72, load information about another information processing apparatus is collected. If it is determined in step S73 that the load of the concerned information processing apparatus is heavier than that of the other information processing apparatus collected in step S72, the process proceeds to the processing of step S75. If it is determined in step S75 that there is not a distributed task in operation, the process proceeds to step S76, where a distributed task is expanded to a lightly loaded node. If it is determined in step S74 that the load of the concerned information processing apparatus is lower than that of the other information processing apparatus, the process proceeds to the processing of step S77, where it is determined if there is a distributed task in operation. If the result of the determination is negative, the process proceeds to step S78, where a distributed task is expanded from a heavily loaded node. After executing the processing of steps S76 and S78, the process proceeds to step S79. In step S79, threads within the distributed task are transferred to a lightly loaded node.

In the second embodiment, each load distribution server basically monitors information relating to the corresponding node, and intends to perform load distribution when the load of the node decreases or increases. There is a method of providing a threshold for the load of the node in order to determine whether or not load distribution is to be performed. The number of such thresholds is not limited to one, but two thresholds may also be provided. In this case, upper and lower thresholds are compared with the current load. If the load exceeds the upper threshold, the server intends to reduce the load of the node. If the load is less than the lower threshold, the server intends to increase the load of the node. Thus, load distribution is realized.

In order to reduce the load of the concerned node, a node having a lighter load than the load of the concerned node is searched for by collecting load information about other nodes. If a distributed task in operation is present in the concerned node and the distributed task is expanded to a more lightly loaded node than the concerned node, threads within the distributed task are transferred from the concerned node to the node having the lighter load.

When a distributed task does not operate in the concerned node, or when a distributed task is present in the concerned node and is expanded to a more heavily loaded node than the concerned node, threads are transferred to a lightly loaded node after expanding a task or a distributed task operating in the concerned node to the lightly loaded node. Thus, the load of the concerned node can be distributed to another node.

When distributing the load of the concerned node to another node, not only is a task in the concerned node expanded, but also a distributed task in operation expanded to a lightly loaded node may be compressed from the concerned node to the lightly loaded node. In such a case, when the load of the entire system is high, the distributed task is not only expanded but also compressed. Hence, the load of processing for holding distributed virtual shared memory is reduced, and message transfer via the network is reduced, whereby the processing capability of the entire system increases.

On the other hand, when the load of the concerned node decreases and it is intended to increase the load of the concerned node, a node having a load higher than the load of the concerned node is searched for by collecting load information of other nodes. As in the case of reducing the load of the concerned node, load distribution can be realized by expanding a distributed task from a heavily loaded node or compressing a distributed task to a lightly loaded node, and transferring threads from the heavily loaded node.

Although in the second embodiment, a description has been provided of a method of collecting load information of other nodes whenever necessary when trying to perform load distribution, a method of collecting load information by periodically transmitting load information of the concerned node to other nodes can also be considered.

Third Embodiment

In the above-described embodiments, threads are transferred from a heavily loaded node to a lightly loaded node using a thread transfer mechanism provided in an operating system. However, even if such a mechanism is not provided, threads can be transferred using a user-level thread control mechanism in a distributed task. In the user-level thread control mechanism, frames called user-level threads are provided, and a program is thereby operated. The user-level thread operates in a thread provided from the operating system (called a kernel thread) by the user-level thread control mechanism (principally provided from a library and executed in the user space of an application), which performs operations, such as stop, resumption of execution, and the like. When stopping the user-level thread, the state of the user-level thread is recorded in the user space of the application. When resuming the user-level thread, a certain kernel thread reads a recorded state, and that state is set as the state of the concerned thread.

Figure 8:
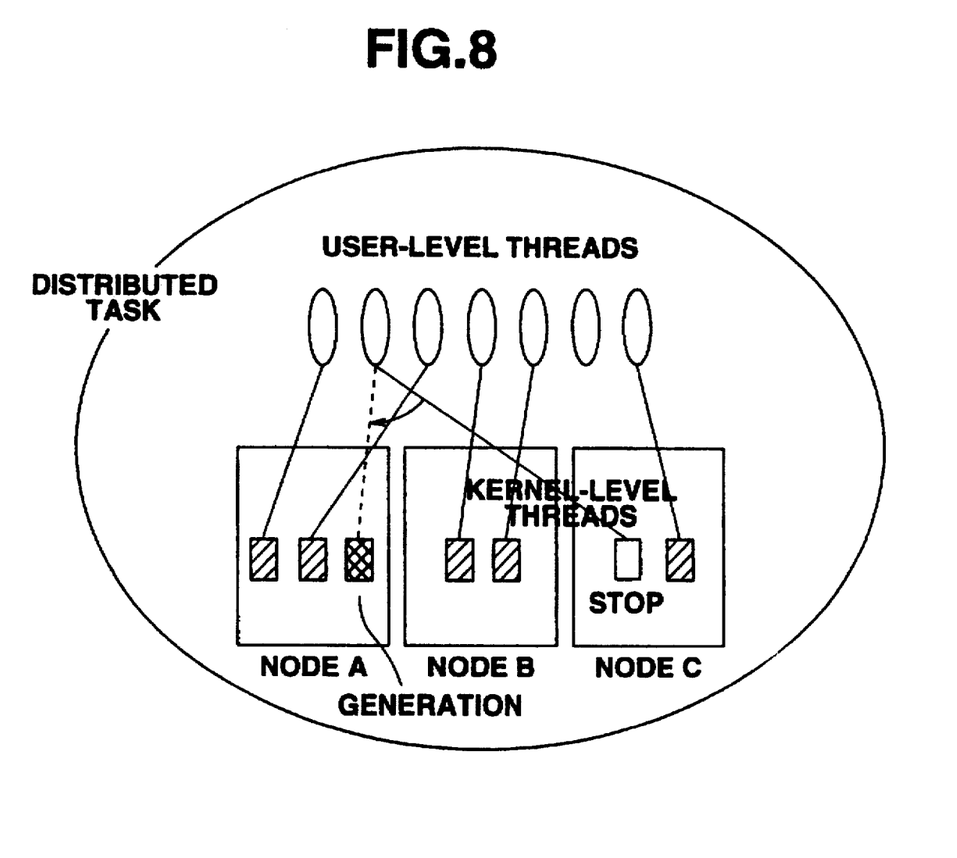
FIG. 8 is a diagram illustrating the relationship between kernel-level threads and user-level threads in a third embodiment of the present invention.

When a frame of such a user-level thread is used, since one consistent virtual storage space is provided between distributed nodes for a distributed task, by writing and storing the state of the user-level thread in the virtual storage space in the node which the user-level thread has been operated within, reading the stored state by a kernel thread in another node, and setting the read state as the state of the concerned thread, a certain thread is observed as if it has been transferred between nodes in an application program described by the user. In such transfer of the user-level thread, as shown in FIG. 8, when another task is generated in node C and the load of node C thereby increases, the corresponding load distribution server requests the task operating in node C to transfer the thread which operates. Accordingly, the user-level thread control mechanism within the distributed task shown in FIG. 8 stores the state of the user-level thread in the virtual storage space in order to stop the thread which is currently operating within the node C. Thus, one kernel thread in node C can be stopped, whereby the load of node C is reduced. When the load of node A decreases (for example, when a task operating in node A has been completed), the corresponding load distribution server provides the user-level thread control mechanism with a thread formation request. The user-level thread control mechanism generates a kernel thread within node A, and causes to resume execution of the user-level thread stopped in node C. Thus, load distribution is realized.

In a method in which the control mechanism of the user-level thread automatically searches for an idle kernel thread and allocate that kernel thread to a ready user-level thread, the load distribution server need not issue a request to transfer threads. In this case, load distribution can be performed by controlling the number of kernel threads allocated to the distributed task for each node.

Figure 9:
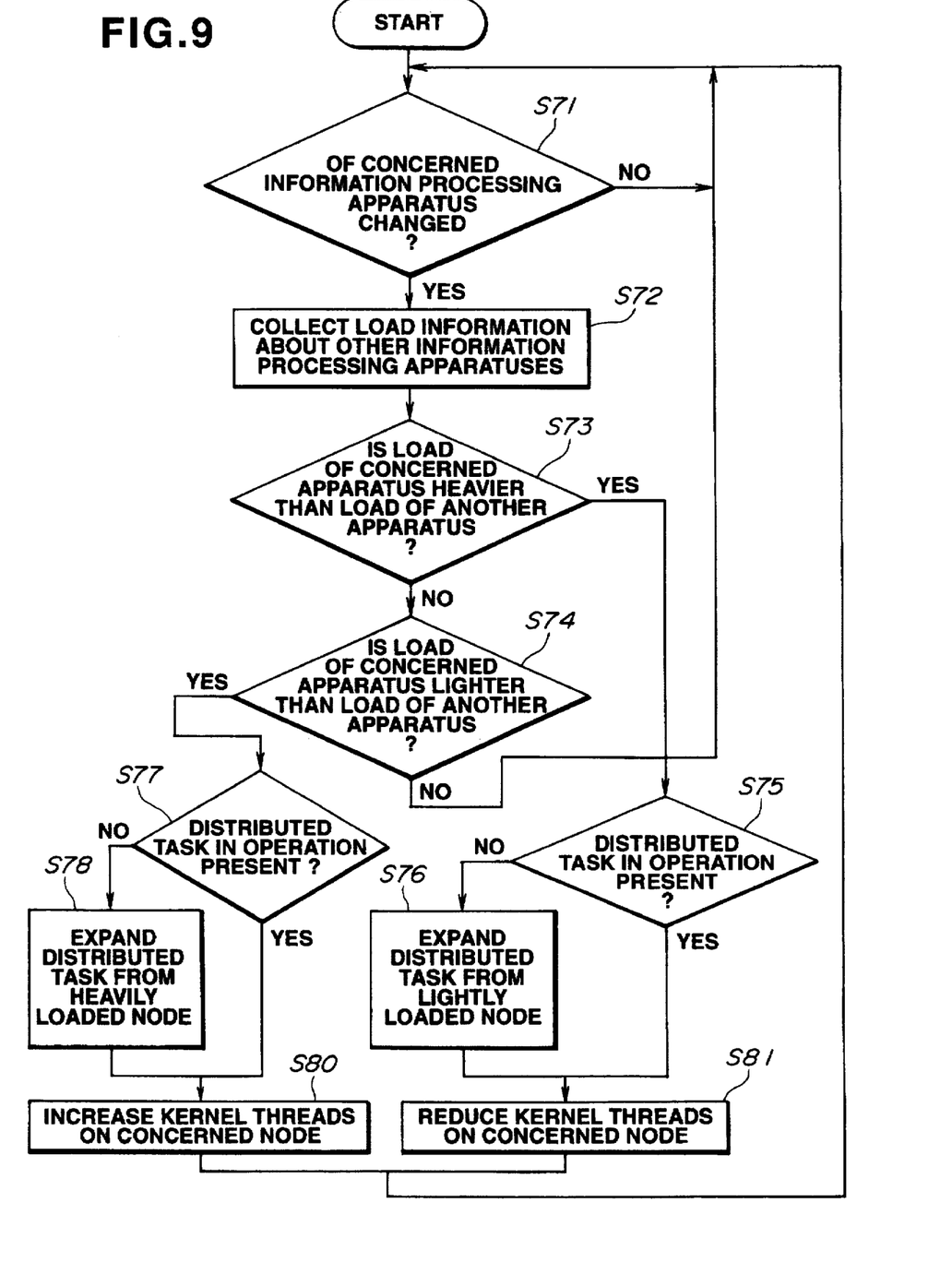
FIG. 9 is a flowchart of a load distribution method when using movement of user-level threads in the third embodiment.

That is, when the number of kernel-level threads decreases, the state of the user-level thread in a kernel thread to be stopped is written and stored in the virtual storage space, and a kernel thread which can operate is automatically searched for. When the number of kernel-level threads increases, the state of the user-level thread which has been stopped and stored in the virtual storage space is read, and the operation of the read thread is resumed. When it is determined that the number of kernel threads to be allocated to one node of a certain distributed task is made 0, the distributed task may be compressed. FIG. 9 is a flowchart illustrating a load distribution method in this case.

Processing from step S71 to step S78 shown in FIG. 9 is the same as the processing from step S71 to step S78 shown in FIG. 7. Hence, description thereof will be omitted. When it has been determined that the load of the concerned node is lighter that the load of another node, the process proceeds to the processing of step S80, where the number of kernel threads in the concerned node is increased. When it has been determined that the load of the concerned node is heavier than the load of another node, the number of kernel threads in the concerned node is reduced.

As described above, in a system having a mechanism of connecting a plurality of distributed information processing apparatuses with a network, and executing tasks by distributing threads within a distributed task sharing virtual storage space, when it is determined that load is not equal as a result of collection of load information about each of the information processing apparatuses, by controlling the degree of distribution of a distributed task in operation and transferring threads operating within the distributed task, the load in the information processing apparatuses is distributed, and the processing capabilities of the information processing apparatuses of the entire system can be sufficiently utilized.

By providing a user-level thread control mechanism in a distributed task and using context switching in a user distributed virtual shared memory space, the load in the information processing apparatuses can be distributed without actually transferring threads within the distributed task.

By periodically circulating load information of a concerned apparatus as a message, load information can be collected efficiently.

By collecting load information of other information processing apparatuses only when the state of the load of a concerned apparatus increases or decreases, and expansion of a distributed task and transfer of threads must be performed, load information can be collected efficiently.

The individual components shown in outline in the drawings are all well known in the load distribution method and system arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A load distribution method having a mechanism of connecting a plurality of information processing apparatuses with a network, and executing a distributed task, whose main storage is shared by a distributed virtual shared memory method, present in the plurality of information processing apparatuses by distributing threads in the respective information processing apparatuses, said method comprising the steps of:

collecting load information about the plurality of information processing apparatuses;

controlling the degree of distribution of a distributed task in operation in accordance with the collected load information so that a heavily loaded information processing apparatus expands a distributed task operating therein to a lightly loaded information processing apparatus and compresses a distributed task expanded to the lightly loaded information processing apparatus to the lightly loaded information processing apparatus and so that the lightly loaded information processing apparatus expands the distributed task operating in the heavily loaded information processing apparatus to the lightly loaded information processing apparatus and compresses a distributed task expanded to the heavily loaded information processing apparatus from the lightly loaded information processing apparatus to the lightly loaded information processing apparatus; and transferring threads operating in the heavily loaded information processing apparatus within distributed task to the lightly loaded information processing apparatus.

2. A method according to claim 1, wherein, in said transferring step, user-level threads are transferred by stopping threads in the heavily loaded information processing apparatus and generating threads in the lightly loaded information processing apparatus by providing a user-level thread control mechanism in the distributed task and using switching of contexts in a user distributed virtual shared memory space.

3. A method according to claim 1, wherein, in said collecting step, load information is collected by periodically circulating load information about a concerned apparatus as a message.

4. A method according to claim 1, wherein, in said collecting step, load information about other information processing apparatuses is collected only when expansion of the distributed task and transfer of threads must be performed because load information about a concerned apparatus decreases or increases.

5. A load distribution system having a mechanism of connecting a plurality of information processing apparatuses with a network, and executing a distributed task, whose main storage is shared by a distributed virtual shared memory method, present in the plurality of information processing apparatuses by distributing threads in the respective information processing apparatuses, said system comprising:

collection means for collecting load information about the plurality of information processing apparatuses;

control means for controlling the degree of distribution of a distributed task in operation in accordance with the collected load information so that a heavily loaded information processing apparatus expands a distributed task operating therein to a lightly loaded information processing apparatus and compresses a distributed task expanded to the lightly loaded information processing apparatus to the lightly loaded information processing apparatus and so that the lightly loaded information processing apparatus expands the distributed task operating in the heavily loaded information processing apparatus to the lightly loaded information processing apparatus and compresses a distributed task expanded to the heavily loaded information processing apparatus from the lightly loaded information processing apparatus to the lightly loaded information processing apparatus; and transfer means for transferring threads operating in the heavily loaded information processing apparatus within a distributed task to the lightly loaded information processing apparatus.

6. A system according to claim 5, wherein said transfer means transfers user-level threads by stopping threads in the heavily loaded information processing apparatus and generating threads in the lightly loaded information processing apparatus by providing a user-level thread control mechanism in the distributed task and using switching of contexts in a user distributed virtual shared memory space.

7. A system according to claim 5, wherein said collection means collects load information by periodically circulating load information about a concerned apparatus as a message.

8. A system according to claim 5, wherein said collection means collects load information about other information processing apparatuses only when expansion of the distributed task and transfer of threads must be performed because load information about a concerned apparatus decreases or increases.

* * * * *